Figures 1, 2:
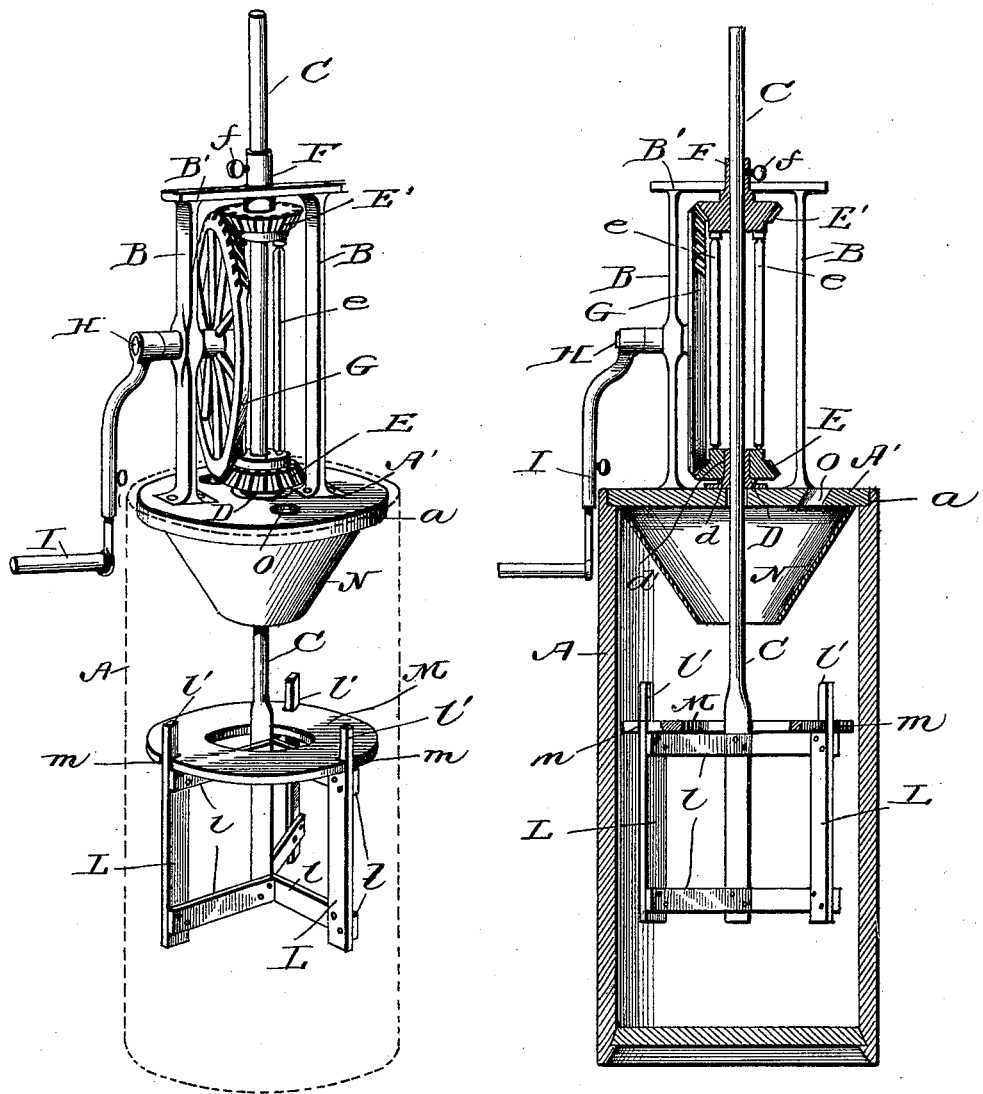

No. 642,650. Patented Feb. 6, 1900.
G. W. WALKER & J. C. PHELPS.
CHURN.
(Application filed June 15, 1899.)
(No Model.)

Witnesses

George W. Walker,
John C. Phelps,
Inventors,
by John B. Thomas & Co.,
Attorneys.

UNITED STATES PATENT OFFICE.

GEORGE W. WALKER AND JOHN C. PHELPS, OF FRIENDSVILLE, TENNESSEE.

CHURN.

SPECIFICATION forming part of Letters Patent No. 642,650, dated February 6, 1900.

Application filed June 15, 1899. Serial No. 720,698. (No model.)

*To all whom it may concern:*

Be it known that we, GEORGE W. WALKER and JOHN C. PHELPS, citizens of the United States, and residents of Friendsville, in the county of Blount and State of Tennessee, have invented certain new and useful Improvements in Churns, of which the following is a specification.

The primary object of our invention is to provide a churn in which peculiar operating mechanism is employed to impart a reversible rotary motion to the dashers for the purpose of causing said dashers to more quickly and thoroughly agitate the cream or milk and greatly facilitate the formation of the butter globules, certain devices coöperating to aerate the cream or milk during the process of churning and prevent it from splashing through the air-inlet openings, the latter also providing for the admission of water in tempering the cream or milk.

The invention consists, therefore, in the combination, with the dashers and shaft supporting the same, of two pinions mounted on the shaft and a partial gear-wheel the teeth of which mesh with the aforesaid pinions alternately to impart a reversible rotary motion to the shaft and dashers, together with a conical deflector and aerator depending from the cover of the churn, and a float carried by the dasher-blades or paddles.

The invention further consists in certain details of construction which add to the simplicity and efficiency of our improved churn.

The following specification enters into a detail description of our invention, reference being had to the accompanying drawings, and to letters thereon which indicate the different parts, and what we particularly claim as new, and desire to protect by Letters Patent, is specifically set forth in the appended claims.

In the accompanying drawings, which form a part of this specification, Figure 1 is a perspective view of a churn constructed in accordance with our invention, the barrel or body of the churn being in section. Fig. 2 is a vertical sectional view.

Referring to said drawings, A designates the barrel or body of the churn, upon which is fitted a suitable cover A', the said cover being preferably provided with a depending marginal flange $a$, while the upper end of the barrel is rabbeted at its inner side to receive said flange. Upon this cover is mounted a supporting-frame for the operating mechanism, comprising the vertical standards B B, connected at their upper ends by a cross-piece B'. In the center of the cover is an opening through which the dasher rod or shaft C passes, and surrounding said opening is a casting D, having a shoulder $d$ and upwardly-projecting sleeve $d'$, forming a bearing for a pinion or bevel-wheel E. This pinion, though serving to turn the dasher-rod, is not attached directly thereto, but is connected to a second pinion or bevel-wheel E' by means of rods $e$, said pinion E' being secured to the lower end of a sleeve or tube F, which passes upward through an opening in the cross-piece of the supporting-frame. The dasher-rod passes through the casting D and sleeve F, receiving its motion from the latter, to which it is adjustably attached by means of a set-screw $f$. A vertical movement of the connected pinions is prevented by the upper pinion bearing against the under side of the cross-piece B', while the lower pinion bears upon the shoulder $d$ of the casting D. Meshing with these pinions or bevel-wheels is a large gear-wheel G, having teeth which extend around only about half of the circumference of the wheel, so that they will turn the pinions alternately, and as said pinions are located at the top and bottom of said partial gear-wheel they will be turned in opposite directions. The partial gear-wheel G is keyed to the inner end of a shaft H, passed through a suitable bearing in one of the standards B of the supporting-frame, and to the outer end of said shaft is attached a crank-handle I to provide for turning the same. The arm of this crank-handle is preferably in two sections connected by set-screws, by which the said arm is adjustable to increase and decrease the leverage.

The dasher-rod depends into the barrel or churn-body, and the lower portion of the same is preferably squared, as shown, or flattened on three sides, to provide for attaching thereto radial arms $l$, to the outer ends of which are secured vertical paddles or dasher-blades L, having at their upper ends reduced extensions $l'$, projecting above the upper set of radial arms and serving as guides for an annular board or float M, which surrounds the dasher-rod and normally rests upon the upper ends of the paddles or dashers. The float is provided with notches $m$ in its periphery to receive the extensions $l'$ and be guided or retained in place thereby.

To the under side of the barrel-cover is attached a conical deflector N, the opening at the lower end of the same being of little less diameter than the opening through the float M. This deflector is for the purpose of preventing the cream or milk from splashing out of openings O in the cover and also serves the purpose of permitting air to pass into the cream or milk during the process of churning. The openings O are preferably at an angle corresponding with the side of the deflector, and they are covered by gauze or fine-wire netting to exclude foreign substances. In tempering the cream or milk water may be poured through these openings.

It is well known that the butter-producing particles of milk are at the upper part of the body of milk, and therefore in adjusting the parts of the churn herein shown and described the dasher-rod is raised or lowered to bring the dashers in the upper part of the milk and in the cream, which is accomplished by first looosening the set-screw $f$, and after the desired adjustment is made the said set-screw is tightened to connect the dasher-rod to the sleeve F, the said sleeve forming the connection between the pinions and dasher-rod, as hereinbefore described. When the parts have been adjusted and the cover is fitted upon the barrel, the operation of the crank-handle will turn the partial gear-wheel G, the teeth of which meshing alternately with the pinions E and E' will impart reversible rotary motions to the dasher-rod, and the backward and forward movements of the dashers will cause a thorough agitation of the cream or milk and quickly separate the butter-globules. The peculiar agitation of the milk by the motions of the dashers will also draw air down into the churn through the openings and deflector, the latter also serving to prevent the milk from splashing out through said openings, while the float is permitted to rise and fall with the swelling of the body of the milk during churning.

The particular manner of agitating the milk and aerating the same will separate the butter globules and mass them much quicker and more effectively than any of the churns in common use.

Having thus described our invention, we claim—

1. In a churn, the combination with the dashers and rod carrying the same, of pinions connected to each other, means for adjustably connecting the dasher-rod to one of said pinions, and a partial gear-wheel adapted to mesh with the pinions alternately to turn them in opposite directions, substantially as shown and described.

2. In a churn, the combination with the dashers and rod carrying the same, of pinions connected to each other by rods, means for adjustably connecting the dasher-rod to one of said pinions, a supporting-frame for the driving mechanism having an upper cross-piece preventing vertical movement of the pinions, an operating-shaft supported in the frame, and a partial gear-wheel attached to said shaft and adapted to mesh with the aforesaid pinions alternately and turn them in opposite directions, substantially as shown and described.

3. In a churn, the combination with the dashers and rod carrying the same, of a supporting-frame for the driving mechanism provided with an upper cross-piece, a pinion mounted on the dasher-rod and having a sleeve passing through the aforesaid cross-piece, a set-screw carried by the sleeve and adapted to engage the dasher-rod, a pinion mounted upon a socket or casting on the cover of the churn, and rods connecting the pinions to each other; together with a partial gear-wheel adapted to mesh with the pinions alternately to turn them in opposite directions, said gear-wheel being attached to a driving-shaft supported by the frame, substantially as shown and for the purpose set forth.

4. In a churn, the combination with the dashers and means for operating the same, of a float movably mounted upon the dashers, and a conical deflector depending from the cover of the churn, said cover having openings entering the deflector, substantially as shown and for the purpose set forth.

5. In a churn, the combination with the dasher-rod, of the vertical dashers connected to said rod and provided with extended upper ends, and a float having notches which receive the aforesaid extensions; together with a conical deflector depending from the cover of the churn, said cover having openings entering the deflector, substantially as shown and for the purpose set forth.

6. In a churn, the combination, of the pinions connected to each other, a partial gear-wheel adapted to mesh with said pinions alternately, a dasher-rod adjustably connected to one of the pinions, dashers attached to the rod and having upper extensions, and a float mounted on the dashers and provided with notches receiving said extensions; together with a conical deflector depending from the cover of the churn, said cover having openings entering the deflector, substantially as shown and for the purpose set forth.

G. W. WALKER.
JOHN C. PHELPS.

Witnesses:
N. C. WALKER,
R. A. PHELPS.